United States Patent
Tetrick

(10) Patent No.: US 12,058,044 B1
(45) Date of Patent: Aug. 6, 2024

(54) APPARATUS AND METHOD OF ROUTING A REQUEST IN A MESH NETWORK

(71) Applicant: Ampere Computing LLC, Santa Clara, CA (US)

(72) Inventor: Raymond Scott Tetrick, Portland, OR (US)

(73) Assignee: Ampere Computing LLC, Santa Clara, CA (US)

( * ) Notice: Subject to any disclaimer, the term of this patent is extended or adjusted under 35 U.S.C. 154(b) by 0 days.

(21) Appl. No.: 18/490,654

(22) Filed: Oct. 19, 2023

(51) Int. Cl.
  *H04L 45/00* (2022.01)
(52) U.S. Cl.
  CPC .................................... *H04L 45/72* (2013.01)
(58) Field of Classification Search
  CPC ....................................................... H04L 45/72
  See application file for complete search history.

(56) References Cited

U.S. PATENT DOCUMENTS

| | | | | |
|---|---|---|---|---|
| 8,001,266 | B1 * | 8/2011 | Gonzalez | G06F 15/177 370/351 |
| 11,675,693 | B2 * | 6/2023 | Baum | G06F 7/523 706/26 |
| 11,829,752 | B2 * | 11/2023 | Capalija | G06F 9/30 |
| 2009/0307463 | A1 * | 12/2009 | Kanoh | G06F 15/17318 712/30 |
| 2017/0156153 | A1 * | 6/2017 | Hart | H04W 76/10 |
| 2019/0158430 | A1 * | 5/2019 | Pierson | H04W 28/14 |
| 2023/0236831 | A1 * | 7/2023 | Capalija | G06F 8/427 712/28 |

* cited by examiner

*Primary Examiner* — Chris Parry
*Assistant Examiner* — Hassan A Khan
(74) *Attorney, Agent, or Firm* — Muncy, Geissler, Olds & Lowe, P.C.

(57) ABSTRACT

Disclosed are techniques for a processing device including a mesh network connecting at least a request node device, multiple home node devices, and multiple slave node devices. In an aspect, the request node device may select a target home node device. The home node devices may be divided into M groups of home node devices. The request may be routed from the request node device to the target home node device. The target home node device may select a target slave node device from a target group of M groups of slave node devices associated with a target group of the M groups of home node devices to which the target home node device belongs. The request may be routed from the target home node device to the target slave node device.

12 Claims, 6 Drawing Sheets

APPARATUS AND METHOD OF ROUTING A REQUEST IN A MESH NETWORK

FIELD OF DISCLOSURE

This disclosure relates generally to a processing device including a mesh network connecting node devices. It relates more specifically, but not exclusively, to an apparatus and a method of routing a request in the mesh network.

BACKGROUND

A processing device (e.g., a processor) may include multiple components interconnected with one another via an interconnection network. In some examples, the components of a processing device may include processing cores, input/output interfaces, memory controllers, etc. However, as the number of components in a processing device increases (e.g., more processing cores in a single processor), communication and coordination among the components become more and more complicated. For example, the components may be connected with one another via an interconnection network inside the processing device. In some examples, the interconnection network may be a coherent mesh network. In some examples, a coherent mesh network may include a network of routing circuit blocks known as cross-points. In some examples, each component may be connected with a corresponding cross-point and may be referred to as a node device.

Accordingly, there is a need for apparatus and methods regarding routing a request made by one node device to another node device in a processing device via the interconnection network of the processing device.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of routing a request in a mesh network that connects at least a request node device includes selecting, by the request node device based on a memory address associated with the request, a target home node device from the home node devices, the home node devices being divided into M groups of home node devices, M being a positive integer equal to or greater than 2; routing the request from the request node device to the target home node device; selecting, by the target home node device based on the memory address associated with the request, a target slave node device from a target group of M groups of slave node devices associated with a target group of the M groups of home node devices to which the target home node device belongs; and routing the request from the target home node device to the target slave node device, wherein the slave node devices are divided into the M groups of slave node devices respectively associated with the M groups of home node devices.

In an aspect, a processing device includes a request node device; multiple home node devices divided into M groups of home node devices, M being a positive integer equal to or greater than 2; multiple slave node devices divided into M groups of slave node devices respectively associated with the M groups of home node devices; and a mesh network that connects at least the request node device, the home node devices, and the slave node devices, wherein the request node device is configured to select, based on a memory address associated with a request, a target home node device from the home node devices, the request is to be routed from the request node device to the target home node device via the mesh network, and wherein the target home node device is configured to select, based on the memory address associated with the request, a target slave node device from a target group of the M groups of slave node devices associated with a target group of the M groups of home node devices to which the target home node device belongs, the request is to be routed from the target home node device to the target slave node device via the mesh network.

In an aspect, a processing device includes means for issuing one or more requests; multiple means for receiving the one or more requests, the multiple means for receiving being divided into M groups of means for receiving, M being a positive integer equal to or greater than 2; multiple means for selecting one of the multiple means for receiving, the multiple means for selecting being divided into M groups of means for selecting respectively associated with the M groups of means for receiving; means for connecting the means for issuing, the multiple means for receiving, and the multiple means for selecting, wherein: wherein the means for issuing comprises means for selecting, based on a memory address associated with a request of the one or more requests, a target means for selecting from the multiple means for selecting, the request is to be routed from the means for issuing to the target means for selecting via the means for connecting, wherein the target means for selecting comprises means for selecting, based on the memory address associated with the request, a target means for receiving from a target group of the M groups of means for receiving associated with a target group of the M groups of means for selecting to which the target means for selecting belongs, the request is to be routed from the target means for selecting to the target means for receiving via the means for connecting.

Other objects and advantages associated with the aspects disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure.

Figure 1A:
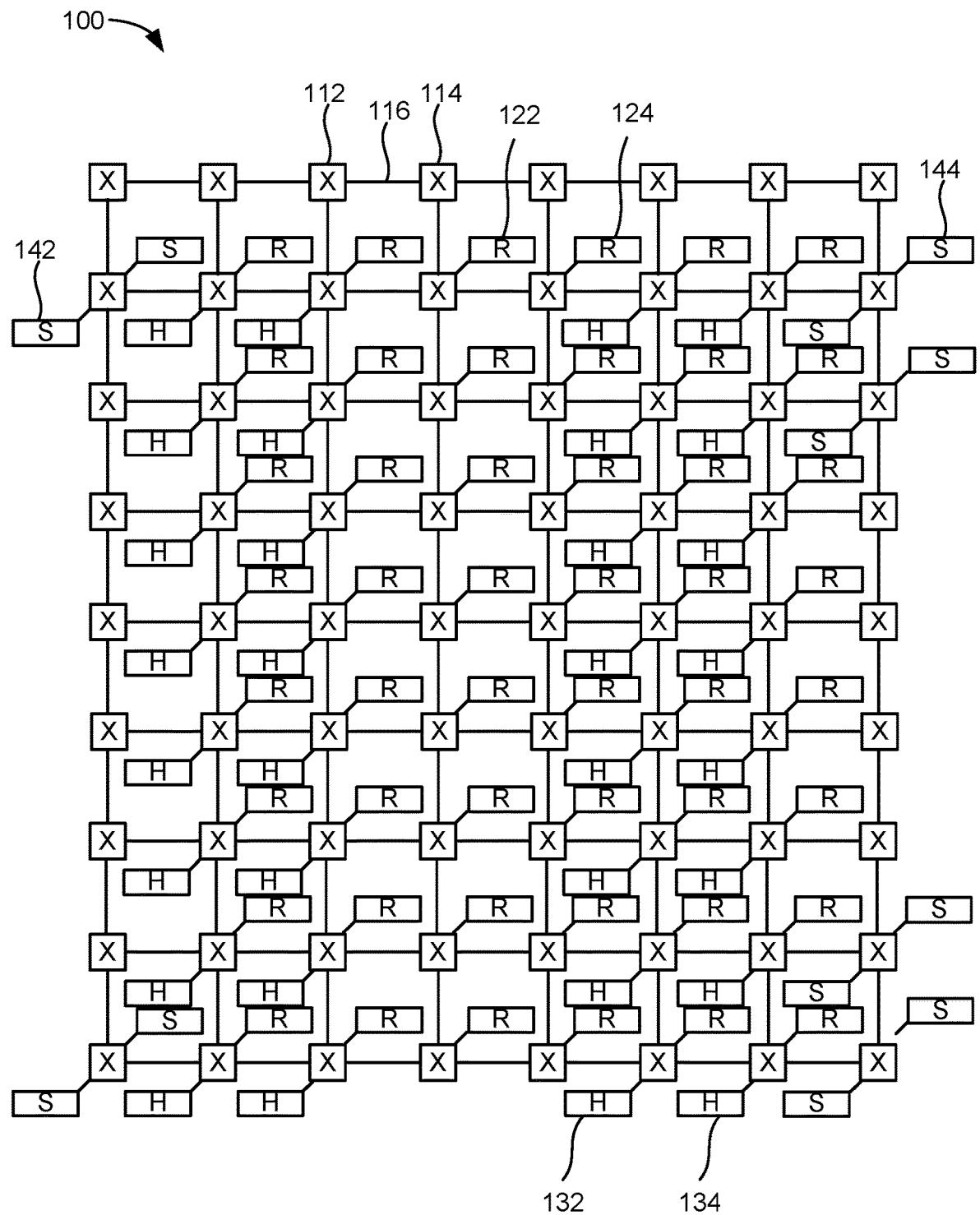
FIG. 1A is a block diagram of a processing device, according to aspects of the disclosure.

Other objects and advantages associated with the aspects disclosed herein will be apparent to those skilled in the art based on the accompanying drawings and detailed description. In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Aspects of the disclosure are provided in the description below and related drawings directed to various examples for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

FIG. 1A is a block diagram of a processing device 100, according to aspects of the disclosure. In some aspects, the processing device 100 may be a processor formed based on an integrated circuit chip or multiple integrated circuit chips within an integrated circuit package. FIG. 1A is a simplified block diagram of the processing device 100, and various components of the processing device 100 may not be depicted in FIG. 1A.

In some aspects, the processing device 100 may include a mesh network that is formed based on a plurality of routing circuit blocks (or also referred to as cross-points in this disclosure, and depicted in FIG. 1A as square boxes labeled 'X' such as blocks 112 and 114) interconnected with one another (depicted in FIG. 1A as solid lines connecting the cross-points such as line 116 connecting blocks 112 and 114). In some aspects, the processing device 100 may include node devices connected with one another via the mesh network. In some aspects, the processing device 100 may include request node devices (depicted in FIG. 1A as rectangular boxes labeled 'R' such as blocks 122 and 124), home node devices (depicted in FIG. 1A as rectangular boxes labeled 'H' such as blocks 132 and 134), slave node devices (depicted in FIG. 1A as rectangular boxes labeled 'S' such as blocks 142 and 144), and/or other types of node devices.

In some aspects, a slave node device may be coupled with a memory controller outside the processing device 100 and may be configured to receive a request to be executed by the memory controller regarding reading or writing data from or to a region of a memory. In some aspects, a request node device may be configured to transmit a request to a slave node device in order to read or write the data from or to the region of the memory. In some aspects, a home node device may be associated with the region of the memory and configured to accept requests from various request node devices and redirect the requests to proper slave node devices.

In some aspects, a request node may be a processing core that is configured to execute an instruction of a program. In some aspects, a home node device or a slave node device may be a state machine or a combinational logic circuit block that is configured to handle predetermined logic state transitions but not configured to execute an instruction of a program.

In some aspects, each one of the cross-points may be assigned with a corresponding cross-point identifier (XP ID). In some aspects, each one of the request node devices, the home node devices, and the slave node devices connected to the mesh network may be assigned with a corresponding node identifier (NID). In some aspects, a request node device may determine a receiving home node device of a request by looking up the NID of the receiving home node device from a first system address map based on an address associated with the request. In some aspects, a home node device may determine a receiving slave node device of a request by looking up the NID of the receiving slave node device from a second system address map based on the address associated with the request. In some aspects, the request may be prepared based on a mesh network communication protocol, such as an Advanced Microcontroller Bus Architecture (AMBA) Coherent Hub Interface (CHI) protocol.

Figure 1B:
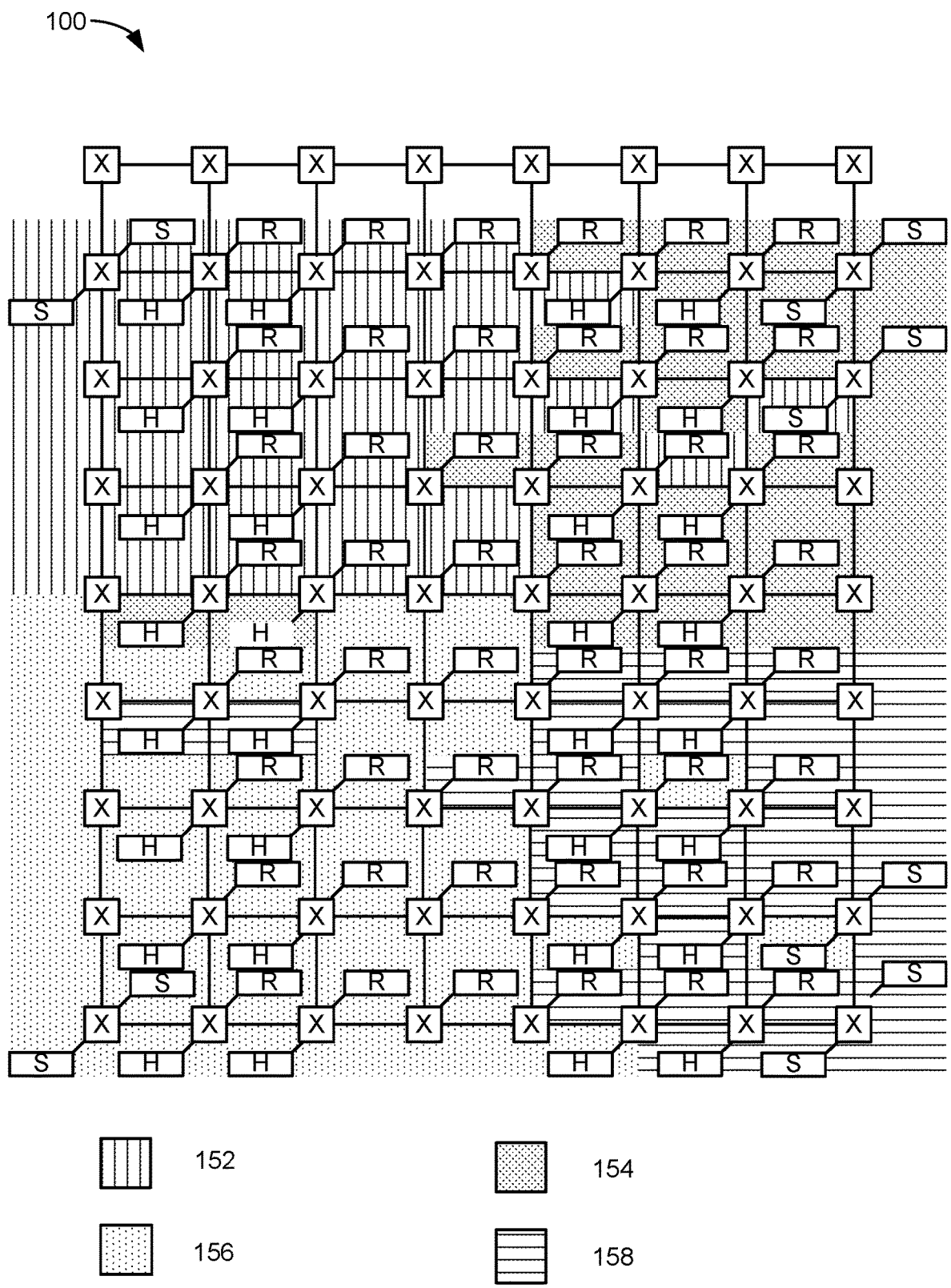
FIG. 1B illustrates grouping of node devices of the processing device in FIG. 1A, according to aspects of the disclosure.

FIG. 1B illustrates grouping of node devices of the processing device 100 in FIG. 1A, according to aspects of the disclosure. The components in FIG. 1B that are the same as those in FIG. 1A are given the same labels, and a detailed description thereof is thus omitted.

In some aspects, in order to improve the address, routing, and/or processing efficiency, a home node device may be configured to access only a subset of the slave node devices of the processing device 100, and different home node devices may be configured to access different subsets of the slave node devices. In some aspects, a subset of home node devices may be disposed closer to one another in the processing device 100 and may be configured to access the same subset of slave node devices. Accordingly, in some aspects, the node devices of the processing device 100 may be arranged into multiple groups of home node devices and slave node devices, where the home node devices may be configured to only access the slave node devices within the same group.

In the example shown in FIG. 1B, the home node devices and the slave node devices of the processing device 100 may be arranged into four groups. For example, a first portion of the home node devices and the slave node devices within the shade 152 may belong to a first group; a second portion of the home node devices and the slave node devices within the shade 154 may belong to a second group; a third home portion of the node devices and the slave node devices within the shade 156 may belong to a third group; and a fourth portion of the home node devices and the slave node devices within the shade 158 may belong to a fourth group. In some aspects, arranging the node devices as shown in FIG. 1B is depicted as a non-limiting example. In some aspects, the node devices of the processing device 100 may be arranged into a different number of groups, such as two, four, or eight groups.

Figure 2:
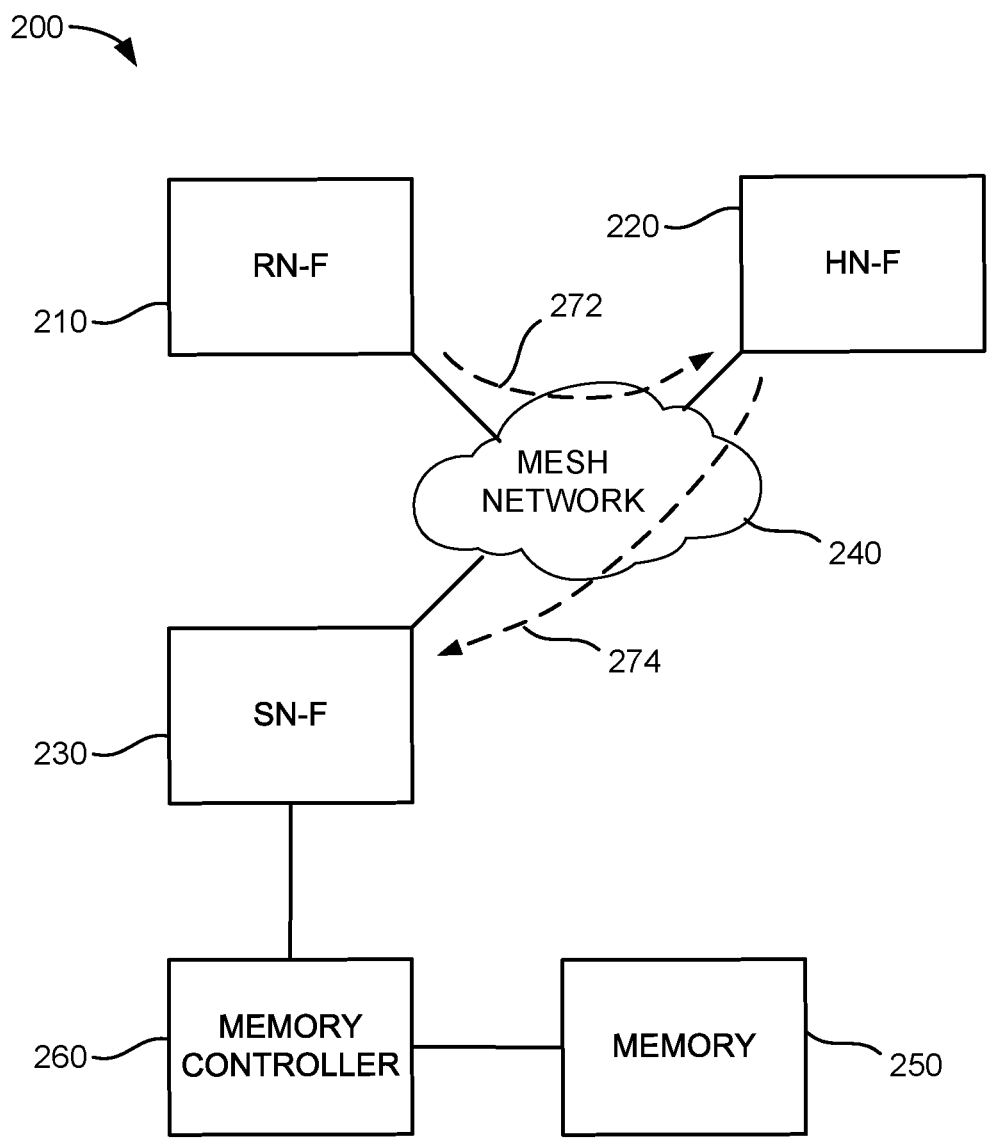
FIG. 2 illustrates an example scenario that includes several node devices of a processing device for routing a request in a mesh network, according to aspects of the disclosure.

FIG. 2 illustrates an example scenario 200 that includes several node devices of a processing device for routing a request in a mesh network, according to aspects of the disclosure. As shown in FIG. 2, the example scenario 200 includes a request node device 210 (labeled "RN-F"), a home node device 220 (labeled "HN-F"), and a slave node device 230 (labeled "SN-F") of a processing device. In some aspects, the request node device 210 may correspond to a request node device in the processing device 100; the home node device 220 may correspond to a home node device in the processing device 100; and the slave node device 230 may correspond to a slave node device in the processing device 100. The request node device 210, the home node device 220, and the slave node device 230 are connected with one another via a mesh network 240.

In some aspects, a memory 250 may be coupled with the processing device (e.g., the processing device 100) and may be accessible by the node devices via memory channels. In some aspects, each memory channel may include two or more sub-channels, and each sub-channel may be accessible through a corresponding memory controller 260 coupled with a corresponding slave node device (e.g., the slave node device 230), and addressed based on the NID of the corresponding slave node device 230. In some aspects, each home node device within a memory address region may access up to six different slave node devices (hence up to six sub-channels) due to the limit of memory address space.

In some aspects, the implementation based on a mesh network may not directly allow the use of more than six sub-channels. As a non-limiting example, in some aspects, there may be 12 channels in a double data rate 5 (DDR5) memory, which may require 24 individual sub-channel controllers. In some aspects, through interleaving across various sub-channel controllers and range detection, accessing more than six sub-channels under the limit of direct access of up to six sub-channels may be possible. For example, in combination with the grouping of the node devices, the entire memory address space may be divided into multiple memory address regions handled by respective groups of home node devices and slave node devices. Also, addressing for a non-power-of-two memory size may be supported as well.

As such, a request to access data having a memory address associated therewith may be processed by a home node device (e.g., the home node device 220 via path 272) and a slave node device (e.g., the slave node device 230 via path 274) within one of the multiple groups of node devices for a corresponding memory address region. For example, while each home node device may still be limited to access up to six different slave node devices within a memory address region, a request node device may, via different home node devices in different group for different memory address region, access more than six different sub-channels (e.g., interleaving across 24 sub-channels based on four groups with 6 sub-channels for each group). Accordingly, the system address map to be used by each home node device may be simplified based on to which group the home node device belongs. Also, the grouping of the node devices and sub-channels of the memory allows scalability of the number of sub-channels that can be accessible by the node devices of a processing device without redesigning the node devices substantively. Moreover, through interleaving, even with the simplified system address, any request node device can still have access to all the system memory bandwidth.

In some aspects, the limitation of six sub-channels or memory controllers that may be directly accessible is described as a non-limiting example. In some aspects, the method and configuration described in this disclosure may be applicable to a system with a limitation of directly accessing N sub-channels or memory controllers, but any request node device can have access to M times of N sub-channels or memory controllers through interleaving and range detection (where M and N may be positive integers).

Figure 3:
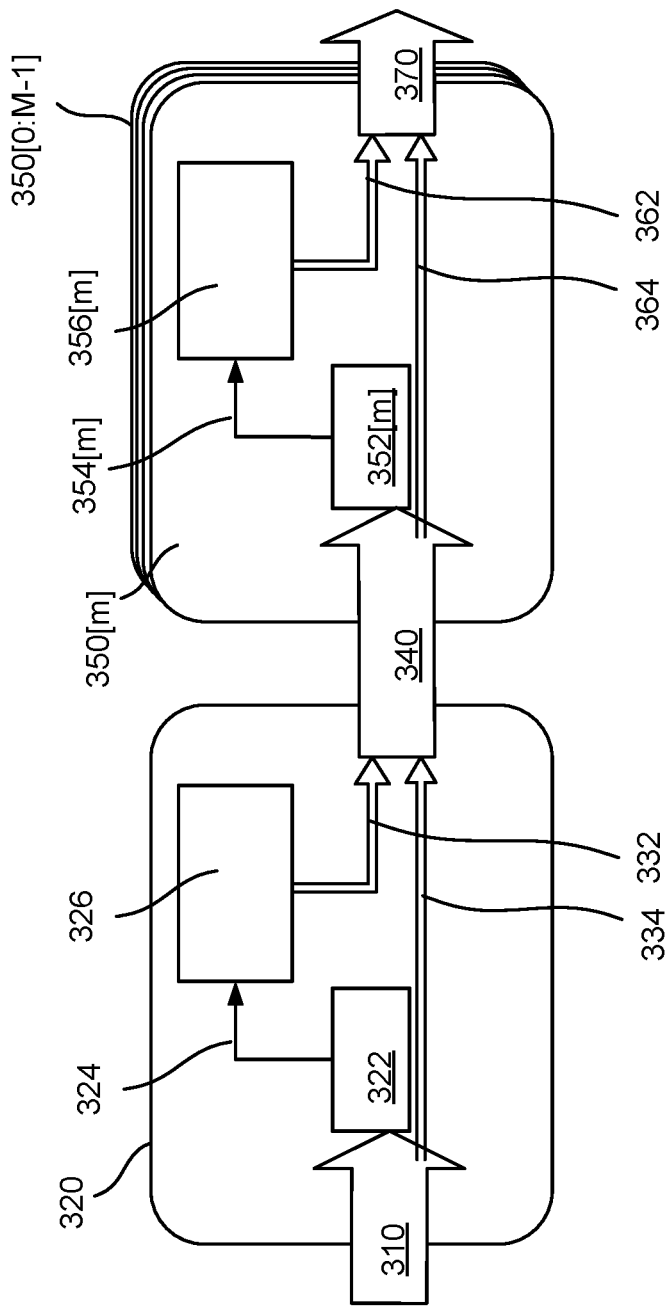
FIG. 3 is a functional block diagram of operations for routing a request in a mesh network, according to aspects of the disclosure.

FIG. 3 is a functional block diagram of operations for routing a request in a mesh network, according to aspects of the disclosure. As shown in FIG. 3, a memory address 310 may be associated with a request made by a request node device (e.g., the request node device 210). The request node device may perform a first mapping operation 320 based on the memory address associated with the request in order to identify a home node device (e.g., the home node device 220) to which the request is to be routed to.

In some aspects, the first mapping operation 320 may include a first mapping function 322 that may be configured to identify a first index 324 of a target home node device from the home node devices of the processing device. Based on the first index 324, the NID 332 of the target home node device corresponding to the first index 324 may also be identified based on a first NID table 326. The first mapping operation 320 may collect the NID 332 of the target home node device and the memory address 334 associated with the request and forward a CHI request 340 together with the associated memory address 334 to the target home node device based on the NID 332. In some aspects, the memory address 334 may be the same as the memory address 310, may be a portion of the memory address 310, or a mapped address based on the memory address 310.

In some aspects, as the home node devices of the processing device may be arranged into M groups, M being a positive integer equal to or greater than 2, the home node device that receives the CHI request 340 may perform one (e.g., mapping operation 350[m]) of M versions of second mapping operations (e.g., mapping operations 350[0:M−1]). In some aspects, M equals 4. In one example, provided that the processing device includes 64 home node devices indexed as $HN\text{-}F_0$ to $HN\text{-}F_{63}$, home node devices $HN\text{-}F_0$ to $HN\text{-}F_{15}$ may belong to a first group and may be configured to perform a first version of second mapping operation (e.g., mapping operation 350[0]); home node devices $HN\text{-}F_{16}$ to $HN\text{-}F_{31}$ may belong to a second group and may be configured to perform a second version of second mapping operation (e.g., mapping operation 350[1]); home node devices $HN\text{-}F_{32}$ to $HN\text{-}F_{47}$ may belong to a third group and may be configured to perform a third version of second mapping operation (e.g., mapping operation 350[2]); and home node devices $HN\text{-}F_{48}$ to $HN\text{-}F_{63}$ may belong to a fourth group and may be configured to perform a fourth version of second mapping operation (e.g., mapping operation 350[3]).

In some aspects, as the slave node devices of the processing device may also be arranged into M groups associated with the M groups of home node devices, respectively, the target home node device that receives the CHI request 340 may be configured to route the request to a target slave node device within a target group of the M groups of slave node devices associated with the target group of home node devices. In some aspects, each group of the M groups of slave node devices may consist of N slave node devices, where N is a positive integer equal to or greater than 2. In some aspects, N equals 6.

As shown in FIG. 3, the first mapping operation 320 may forward a CHI request 340, together with the associated memory address, to the target home node device as identified by the first index 324 and the NID 332. The target home node device may perform a second mapping operation 350[m] based on the memory address associated with the CHI request 340 in order to identify a slave node device (e.g., the slave node device 230) to which the request is to be routed to. In some aspects, the second mapping operation 350[m] may correspond to a version of second mapping operation for the target group of home node devices for selecting a slave node from the associated target group of slave node devices.

In one example, provided that the target group (indexed as the "m+1"-th group) of slave node devices includes 6 slave node devices indexed as $SN-F_{m+0}$ to $SN-F_{m+5}$, the second mapping operation 350[m] may be configured to identify a second index 354[m] of a target slave node device (e.g., the slave node device $SN-F_{m+3}$) from the target group of slave node devices based on the memory address 364 come with the CHI request 340. Based on the second index 354[m], the NID 362[m] of the target slave node device corresponding to the second index 354[m] may also be identified based on a second NID table 356[m]. The second mapping operation 350[m] may collect the NID 362[m] of the target slave node device and the memory address 364 associated with the request and forward a CHI request 370 together with the associated memory address 364[m] to the target slave node device based on the NID 362[m]. In some aspects, the memory address 364 may be the same as the memory address 334, may be a portion of the memory address 334, or a mapped address based on the memory address 334.

Figure 4:
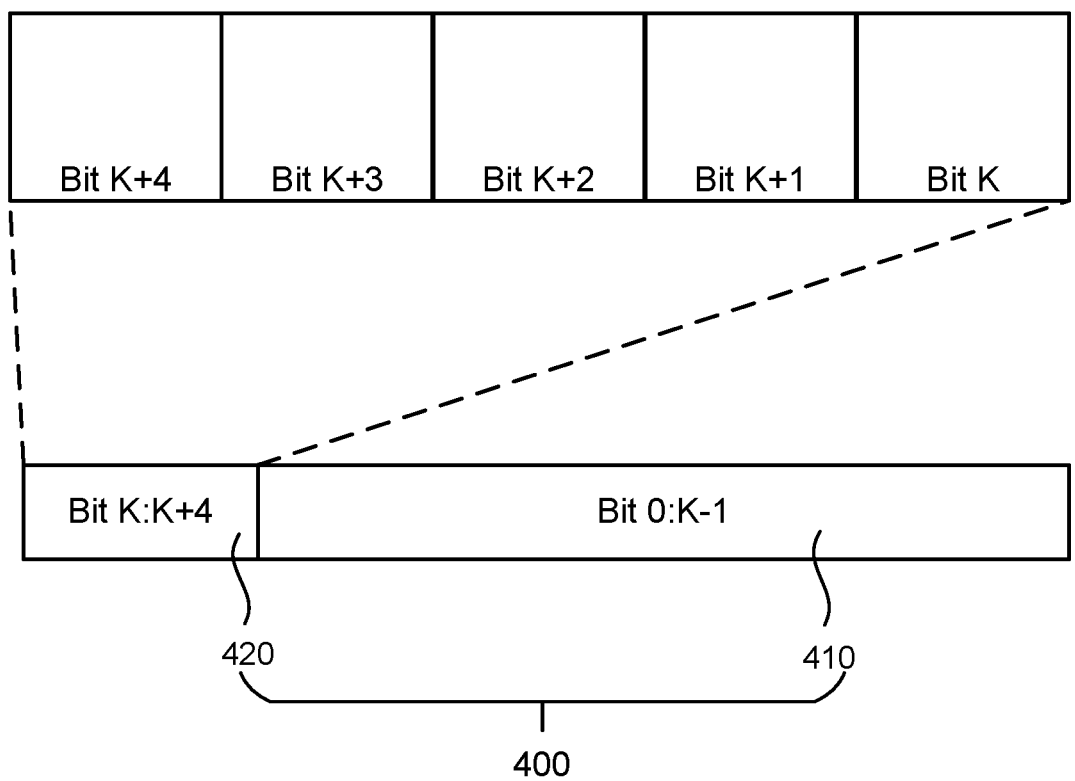
FIG. 4 illustrates an example memory address associated with a request, according to aspects of the disclosure.

FIG. 4 illustrates an example memory address 400 associated with a request, according to aspects of the disclosure. In some aspects, the memory address 400 may be used during the first mapping operation 320 and/or the second mapping operation 350[m] in FIG. 3. In this example, the memory address 400 may include (K+5) bits, and may include a first portion 410 corresponding to Bit 0:K−1 and a second portion 420 corresponding to Bit K:K+4. In some aspects, K is a positive integer. In one example, K may range from 11 to 123.

In some aspects, the second portion 420 may include channel bits specifying one slave node device within a target group of slave node devices as a target slave node device. In some aspects, the second portion may 420 further include capacity bits specifying a target group of the M groups of home node devices to which the target home node device belongs. In some aspects, the capacity bits may be arranged between a least significant portion of the channel bits and a most significant portion of the channel bits. In some aspects, the second mapping function 352[m] in FIG. 3 may identify the version of the second mapping function 352[m] based on the capacity bits and may identify the second index 354[m] based on the channel bits.

For example, as shown in FIG. 4, Bits K, K+3, and K+4 may be used as the channel bits; and Bits K+1 and K+2 may be used as the capacity bits. In some aspects, the Bits K+3 and K+4 may correspond to the least significant portion of the channel bits; and the Bit K may correspond to the most significant portion of the channel bits. In some aspects, the arrangement as shown in FIG. 4 may divide the memory address space into at most three non-contiguous regions and thus may improve the overall usage efficiency of the memory address space. In some aspects, the arrangement as shown in FIG. 4 may reduce the range registers that may be needed for implementing the non-power-of-two memory size support.

Figure 5:
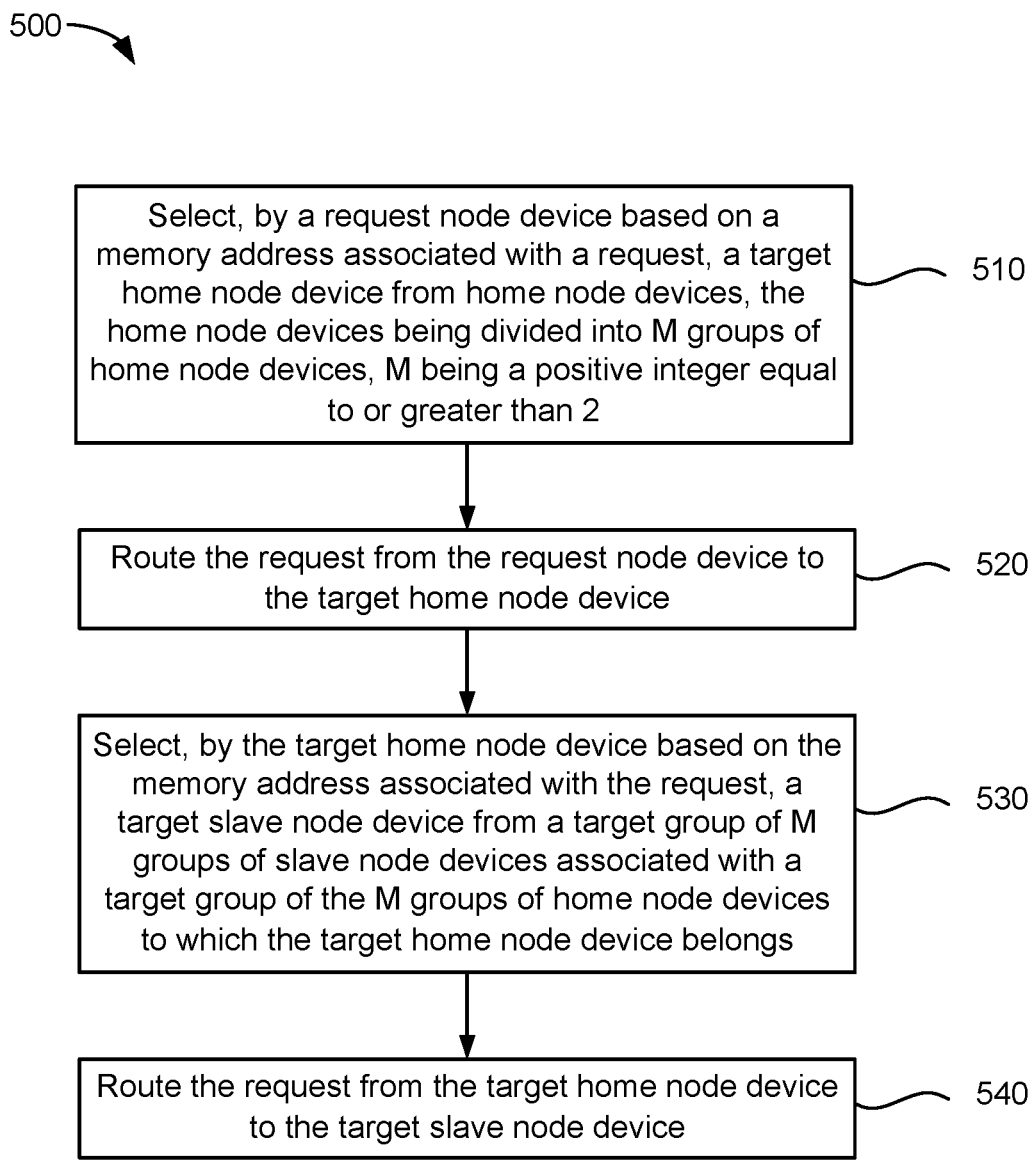
FIG. 5 illustrates an example method of routing a request in a mesh network, according to aspects of the disclosure.

FIG. 5 illustrates an example method 500 of routing a request in a mesh network, according to aspects of the disclosure. In some aspects, the mesh network may connect at least a request node device, multiple home node devices, and multiple slave node devices. In some aspects, the method 500 may be performed by the node devices and mesh network of the processing device 100 depicted in FIGS. 1A and 1B. In some aspects, the method 500 may be performed based on the examples illustrated in FIGS. 2 to 4.

At operation 510, a target home node may be selected from the home node devices by the request node device based on a memory address associated with the request. In some aspects, the home node devices may be divided into M groups of home node devices, where M may be a positive integer equal to or greater than 2. In some aspects, M equals 4. In some aspects, operation 510 may be performed by one of the request node device in FIGS. 1A and 1B or the request node device 210 in FIG. 2. In some aspects, operation 510 may correspond to the first mapping operation 320 in FIG. 3.

At operation 520, the request may be routed from the request node device to the target home node device. In some aspects, operation 520 may be performed by the mesh network in FIGS. 1A and 1B or the mesh network 240 in FIG. 2. In some aspects, operation 520 may correspond to the operation performed on the CHI request 340 in FIG. 3.

At operation 530, a target slave node may be selected, by the target home node device based on the memory address associated with the request, from a target group of M groups of slave node devices associated with a target group of the M groups of home node devices to which the target home node device belongs. In some aspects, the slave node devices may be divided into the M groups of slave node devices respectively associated with the M groups of home node devices. In some aspects, each group of the M groups of slave node devices may consist of N slave node devices, where N may be a positive integer equal to or greater than 2. In some aspects, N equals 6.

In some aspects, operation 530 may be performed by one of the home node device in FIGS. 1A and 1B or the home node device 220 in FIG. 2. In some aspects, operation 530 may correspond to the second mapping operation 350[m] in FIG. 3.

In some aspects, as shown in FIG. 4, the memory address may include channel bits specifying one slave node device within the target group of slave node devices as the target slave node device. In some aspects, as shown in FIG. 4, the memory address may include capacity bits specifying the target group of the M groups of home node devices to which the target home node device belongs. In some aspects, as shown in FIG. 4, the capacity bits may be arranged between a least significant portion of the channel bits and a most significant portion of the channel bits.

At operation 540, the request may be routed from the target home node device to the target slave node device. In some aspects, operation 540 may be performed by the mesh network in FIGS. 1A and 1B or the mesh network 240 in FIG. 2. In some aspects, operation 540 may correspond to the operation performed on the CHI request 370 in FIG. 3.

As will be appreciated, a technical advantage of the method 500 is expanding the support of multiple sub-channels and non-power-of-two memory size by dividing the home node devices and slave node devices into multiple groups, where each home node device within a group may only be responsible of access the slave node devices within an associated group of slave node devices. Accordingly, the system address map to be used by each home node device may be simplified based on to which group the home node device belongs. Also, the grouping of the node devices and sub-channels of the memory allows scalability of the number of sub-channels that can be accessible by the node devices of a processing device without redesigning the node devices substantively.

Those of skill in the art will appreciate that the information and signals described above may be represented using any of a variety of different technologies and techniques. For example, data, instructions, commands, information, signals, bits, symbols, and chips that may be referenced throughout the description above may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of routing a request in a mesh network that connects at least a request node device, multiple home node devices, and multiple slave node devices, the method comprising: selecting, by the request node device based on a memory address associated with the request, a target home node device from the home node devices, the home node devices being divided into M groups of home node devices, M being a positive integer equal to or greater than 2; routing the request from the request node device to the target home node device; selecting, by the target home node device based on the memory address associated with the request, a target slave node device from a target group of M groups of slave node devices associated with a target group of the M groups of home node devices to which the target home node device belongs; and routing the request from the target home node device to the target slave node device, wherein the slave node devices are divided into the M groups of slave node devices respectively associated with the M groups of home node devices.

Clause 2. The method of clause 1, wherein M equals 4.

Clause 3. The method of any of clauses 1 to 2, wherein each group of the M groups of slave node devices consists of N slave node devices, N being a positive integer equal to or greater than 2.

Clause 4. The method of clause 3, wherein N equals 6.

Clause 5. The method of any of clauses 1 to 4, wherein the memory address comprises channel bits specifying one slave node device within the target group of slave node devices as the target slave node device.

Clause 6. The method of any of clauses 1 to 5, wherein the memory address comprises capacity bits specifying the target group of the M groups of home node devices to which the target home node device belongs.

Clause 7. The method of any of clauses 1 to 4, wherein the memory address comprises: channel bits specifying one slave node device within the target group of slave node devices as the target slave node device; and capacity bits specifying the target group of the M groups of home node devices to which the target home node device belongs, wherein the capacity bits are arranged between a least significant portion of the channel bits and a most significant portion of the channel bits.

Clause 8. A processing device, comprising: a request node device; multiple home node devices divided into M groups of home node devices, M being a positive integer equal to or greater than 2; multiple slave node devices divided into M groups of slave node devices respectively associated with the M groups of home node devices; and a mesh network that connects at least the request node device, the home node devices, and the slave node devices, wherein the request node device is configured to select, based on a memory address associated with a request, a target home node device from the home node devices, the request is to be routed from the request node device to the target home node device via the mesh network, and wherein the target home node device is configured to select, based on the memory address associated with the request, a target slave node device from a target group of the M groups of slave node devices associated with a target group of the M groups of home node devices to which the target home node device belongs, the request is to be routed from the target home node device to the target slave node device via the mesh network.

Clause 9. The processing device of clause 8, wherein M equals 4.

Clause 10. The processing device of any of clauses 8 to 9, wherein each group of the M groups of slave node devices consists of N slave node devices, N being a positive integer equal to or greater than 2.

Clause 11. The processing device of clause 10, wherein N equals 6.

Clause 12. The processing device of any of clauses 8 to 11, wherein the memory address comprises channel bits specifying one slave node device within the target group of slave node devices as the target slave node device.

Clause 13. The processing device of any of clauses 8 to 12, wherein the memory address comprises capacity bits specifying the target group of the M groups of home node devices to which the target home node device belongs.

Clause 14. The processing device of any of clauses 8 to 11, wherein the memory address comprises: channel bits specifying one slave node device within the target group of slave node devices as the target slave node device; and capacity bits specifying the target group of the M groups of home node devices to which the target home node device belongs, wherein the capacity bits are arranged between a least significant portion of the channel bits and a most significant portion of the channel bits.

Clause 15. A processing device, comprising: means for issuing one or more requests; multiple means for receiving the one or more requests, the multiple means for receiving being divided into M groups of means for receiving, M being a positive integer equal to or greater than 2; multiple means for selecting one of the multiple means for receiving, the multiple means for selecting being divided into M groups of means for selecting respectively associated with the M groups of means for receiving; means for connecting the means for issuing, the multiple means for receiving, and the multiple means for selecting, wherein: wherein the means for issuing comprises means for selecting, based on a memory address associated with a request of the one or more requests, a target means for selecting from the multiple means for selecting, the request is to be routed from the means for issuing to the target means for selecting via the means for connecting, wherein the target means for selecting comprises means for selecting, based on the memory address associated with the request, a target means for receiving from a target group of the M groups of means for receiving associated with a target group of the M groups of means for selecting to which the target means for selecting belongs, the request is to be routed from the target means for selecting to the target means for receiving via the means for connecting.

Clause 16. The processing device of clause 15, wherein M equals 4.

Clause 17. The processing device of any of clauses 15 to 16, wherein each group of the M groups of means for receiving consists of N means for receiving, N being a positive integer equal to or greater than 2.

Clause 18. The processing device of clause 17, wherein N equals 6.

Clause 19. The processing device of any of clauses 15 to 18, wherein the memory address comprises channel bits specifying one means for receiving within the target group of means for receiving as the target means for receiving.

Clause 20. The processing device of any of clauses 15 to 19, wherein the memory address comprises capacity bits specifying the target group of the M groups of means for selecting to which the target means for selecting belongs.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more of the stated elements. Also, as used herein, the terms "has," "have," "having," "comprises," "comprising," "includes," "including," and the like does not preclude the presence of one or more additional elements (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of") or the alternatives are mutually exclusive (e.g., "one or more" should not be interpreted as "one and more"). Furthermore, although components, functions, actions, and instructions may be described or claimed in the singular, the plural is contemplated unless limitation to the singular is explicitly stated. Accordingly, as used herein, the articles "a," "an," "the," and "said" are intended to include one or more of the stated elements. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

What is claimed is:

1. A method of routing a request in a mesh network that connects at least a request node device, multiple home node devices, and multiple slave node devices, the method comprising:
   selecting, by the request node device based on a memory address associated with the request, a target home node device from the home node devices, the home node devices being divided into M groups of home node devices, M being a positive integer equal to or greater than 2;
   routing the request from the request node device to the target home node device;
   selecting, by the target home node device based on the memory address associated with the request, a target slave node device from a target group of M groups of slave node devices associated with a target group of the M groups of home node devices to which the target home node device belongs; and
   routing the request from the target home node device to the target slave node device,
   wherein the slave node devices are divided into the M groups of slave node devices respectively associated with the M groups of home node devices,
   wherein the memory address comprises:
      channel bits specifying one slave node device within the target group of slave node devices as the target slave node device; and
      capacity bits specifying the target group of the M groups of home node devices to which the target home node device belongs, and
   wherein the capacity bits are arranged between a least significant portion of the channel bits and a most significant portion of the channel bits.

2. The method of claim 1, wherein M equals 4.

3. The method of claim 1, wherein each group of the M groups of slave node devices consists of N slave node devices, N being a positive integer equal to or greater than 2.

4. The method of claim 3, wherein N equals 6.

5. A processing device, comprising:
   a request node device;
   multiple home node devices divided into M groups of home node devices, M being a positive integer equal to or greater than 2;
   multiple slave node devices divided into M groups of slave node devices respectively associated with the M groups of home node devices; and
   a mesh network that connects at least the request node device, the home node devices, and the slave node devices,
   wherein the request node device is configured to select, based on a memory address associated with a request, a target home node device from the home node devices, the request is to be routed from the request node device to the target home node device via the mesh network,
   wherein the target home node device is configured to select, based on the memory address associated with the request, a target slave node device from a target group of the M groups of slave node devices associated with a target group of the M groups of home node devices to which the target home node device belongs, the request is to be routed from the target home node device to the target slave node device via the mesh network,
   wherein the memory address comprises:
      channel bits specifying one slave node device within the target group of slave node devices as the target slave node device; and
      capacity bits specifying the target group of the M groups of home node devices to which the target home node device belongs, and
   wherein the capacity bits are arranged between a least significant portion of the channel bits and a most significant portion of the channel bits.

6. The processing device of claim 5, wherein M equals 4.

7. The processing device of claim 5, wherein each group of the M groups of slave node devices consists of N slave node devices, N being a positive integer equal to or greater than 2.

8. The processing device of claim 7, wherein N equals 6.

9. A device, comprising:
   processing means for issuing one or more requests;
   multiple processing means for receiving the one or more requests, the multiple processing means for receiving being divided into M groups of processing means for receiving, M being a positive integer equal to or greater than 2;

multiple processing means for selecting one of the multiple processing means for receiving, the multiple processing means for selecting being divided into M groups of processing means for selecting respectively associated with the M groups of processing means for receiving;

processing means for connecting the processing means for issuing, the multiple processing means for receiving, and the multiple processing means for selecting, wherein the processing means for issuing is configured to select, based on a memory address associated with a request of the one or more requests, a target processing means for selecting from the multiple processing means for selecting, the request is to be routed from the processing means for issuing to the target processing means for selecting via the processing means for connecting, wherein the target processing means for selecting is configured to select, based on the memory address associated with the request, a target processing means for receiving from a target group of the M groups of processing means for receiving associated with a target group of the M groups of processing means for selecting to which the target processing means for selecting belongs, the request is to be routed from the target processing means for selecting to the target processing means for receiving via the processing means for connecting, wherein the memory address comprises:
   channel bits specifying one processing means for receiving within the target group of processing means for receiving as the target processing means for receiving; and
   capacity bits specifying the target group of the M groups of processing means for selecting to which the target processing means for selecting belongs, and wherein the capacity bits are arranged between a least significant portion of the channel bits and a most significant portion of the channel bits.

10. The device of claim 9, wherein M equals 4.

11. The device of claim 9, wherein each group of the M groups of processing means for receiving consists of N processing means for receiving, N being a positive integer equal to or greater than 2.

12. The device of claim 11, wherein N equals 6.

* * * * *